W. F. COCHRANE.
HARVESTER.

No. 173,899. Patented Feb. 22, 1876.

WITNESSES

INVENTOR
W. F. Cochrane
by Hill & Ellsworth
his Attorneys.

UNITED STATES PATENT OFFICE.

WILLIAM F. COCHRANE, OF LA FAYETTE, INDIANA.

IMPROVEMENT IN HARVESTERS.

Specification forming part of Letters Patent No. 173,899, dated February 22, 1876; application filed April 20, 1874.

*To all whom it may concern:*

Be it known that I, WILLIAM F. COCHRANE, of La Fayette, in the county of Tippecanoe and State of Indiana, have invented a new and Improved Reel-Post for Harvesters; and I do hereby declare the following to be a full and exact description of the same, reference being had to the accompanying drawings, forming part of this specification, in which—

Figure 1:
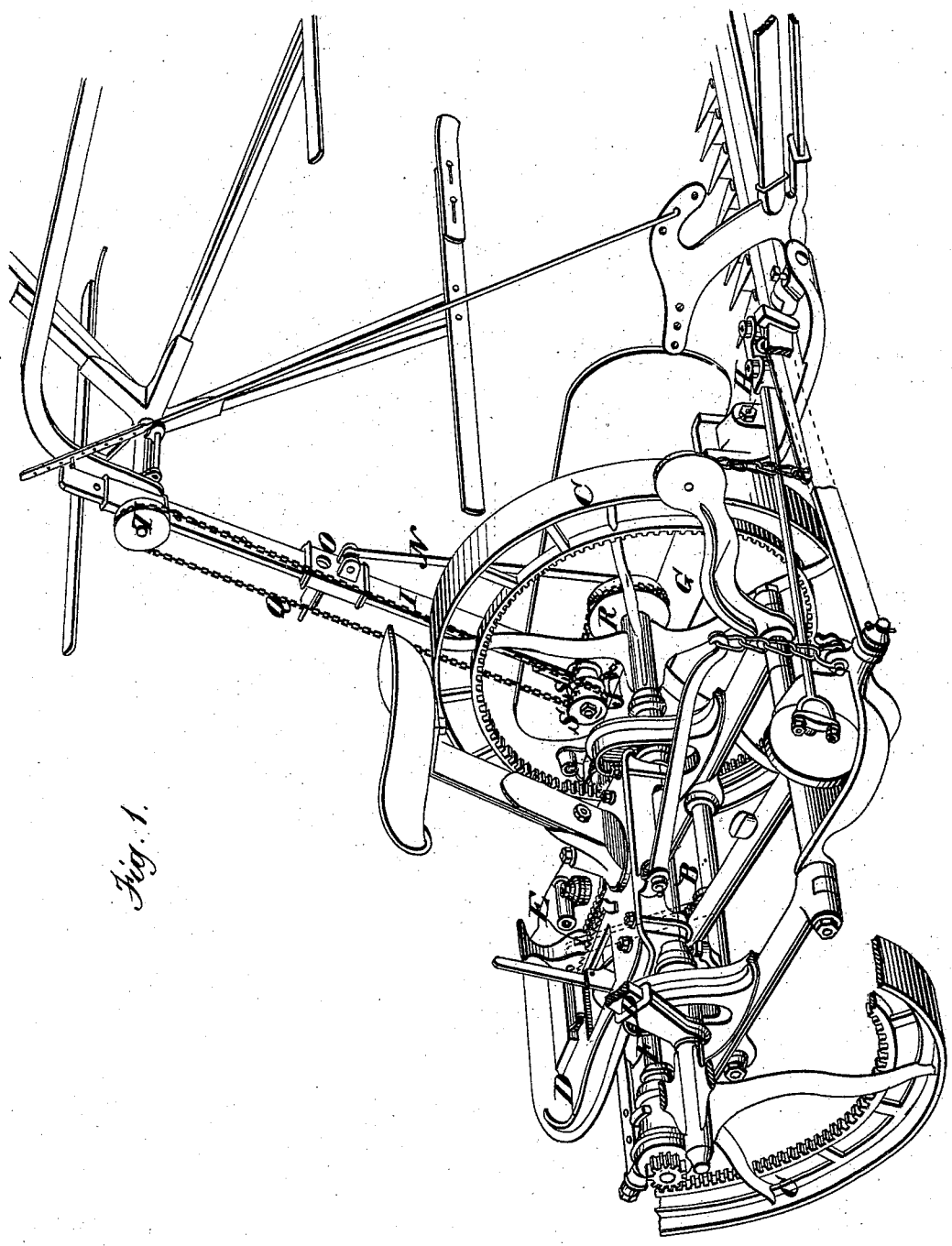
Figure 2:
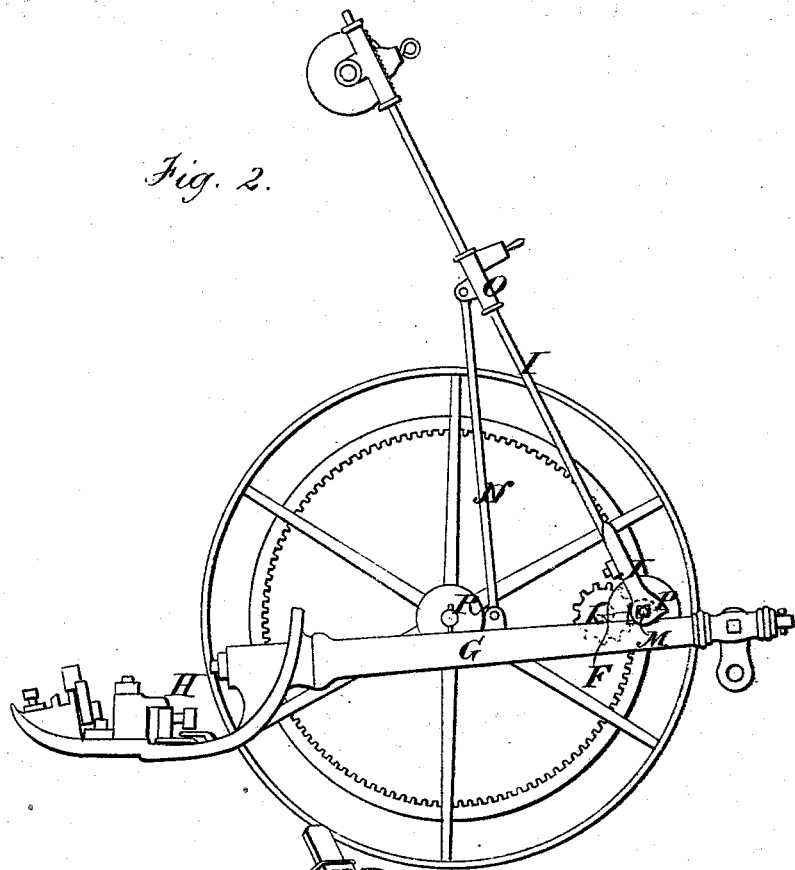
Figure 3:
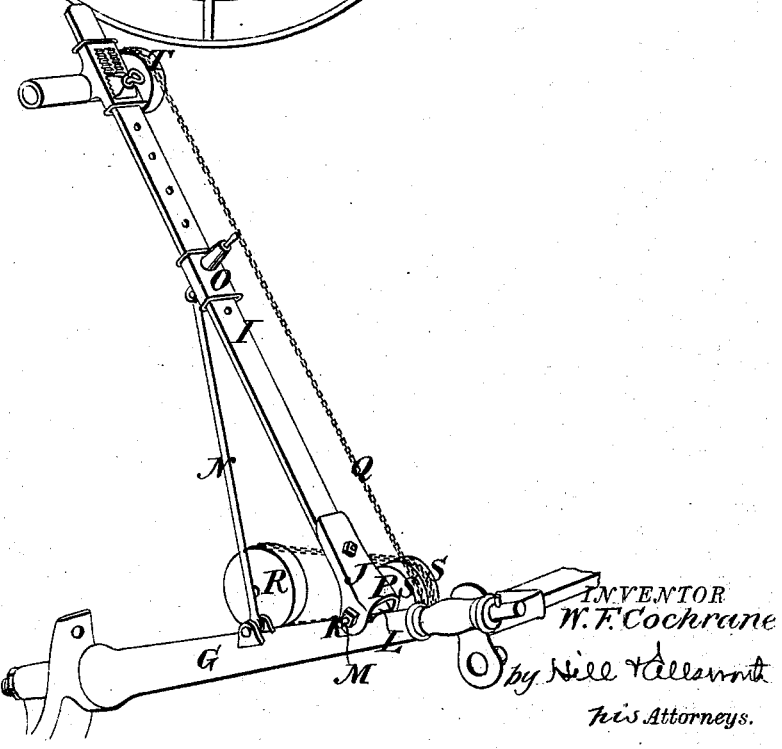

Figure 1, Sheet 1, is a rear perspective view of a harvester, showing the application of the reel-post. Fig. 2, Sheet 2, is an inner side elevation of the reel-post, drag-bar, and inner driving-wheel of the machine; and Fig. 3, Sheet 2, is a perspective view of the reel-post and drag-bar detached from the machine.

Similar letters of reference in the accompanying drawings denote the same parts.

My invention has for its object to improve the means for mounting the reel and reel-post upon a harvesting-machine; and to this end it consists in pivoting the reel-post to the drag-bar by means of a knuckle-joint, so constructed as to prevent the reel-post from being swung too far forward, and to form a shield to exclude the dirt from the joint, as I will now proceed to describe.

The frame of the harvester is constructed with vertical segmental slots in the side pieces, through which the main axle B passes to support the driving-wheels C C. The slots are provided with segmental racks to engage with pinions upon the axle, so that when the latter is rocked by its hand-lever D the frame will be raised and lowered. The gear-frame is suspended from the tongue-frame D by a traction-latch, E, pivoted to such frame between the main axle and the counter or driving shaft F, and adapted for adjustment in a slot of the tongue-frame to change the position of the frame. The counter-shaft is provided with pinions to engage with the toothed rims of the driving-wheels in front of the axle for operating the cutting mechanism. G is the drag-bar, carrying the cutting mechanism H. Its rear end, together with the shoe, is suspended from the frame of the machine by an extension bar and chain, or by other suitable means, and its front end is pivoted to the front cross-bar of the frame outside the inner driving-wheel, as shown.

The machine thus far described I do not claim in this application, as I have already made it the subject of applications for Letters Patent heretofore filed.

I is the reel-post, carrying the reel at its upper end, and bolted to a socket, J, at its lower end, which socket is cast with side lugs K, to fit over the ends of a transverse boss, L, cast on the drag-bar in line, or nearly so, with the counter-shaft F of the machine. The socket and boss are pivoted together by a bolt, M, passing through the latter and the lugs of the socket, to admit of the reel-post being inclined for adjusting the position of the reel with respect to the cutting mechanism. The post is supported in an upright or inclined position by the back brace N, pivoted at its lower end to the drag-bar, and at its upper end to the adjustable sleeve O on the reel-post.

The foot of the socket J is further cast with a front projection or shield, P, extending downward over the front of the boss sufficiently far to strike the drag-bar, when the reel-post is thrown into an upright position, and prevent it from being swung or pushed over onto the horses. The shield strengthens the lugs of the socket when the pivot bolt and nut are set up, and prevents them from breaking off. It also protects the joint by excluding dirt therefrom, and the whole pivotal connection forms a knuckle-joint, the parts of which strengthen and support each other.

Q is the reel-chain, passing from the sheave R on the hub of the inner driving-wheel around the sheaves S, mounted upon the pivot-bolt of the socket J, and thence up around the sheaves T on the end of the reel-shaft.

By arranging the sheaves S and joint of the reel-post on a line, or nearly so, with the counter-shaft F, the drag-bar occupying the same plane, or nearly the same plane, with the frame of the machine, the cutting mechanism and frame can be raised and lowered without lengthening or shortening the reel-chain or varying the location of the reel-post. Both the counter-shaft and reel-post pivot move about the main axle in the same arc of a circle when the machine is in operation, and therefore have no effect to tighten or loosen the reel-chain, which is run practically tight. The use of a spring or spring-tension sheave to take up the slack of the chain is consequently unnecessary. The drag-bar rocks axially in its socket to conform the cutting mechanism to the surface of the ground without displacing the chain from its guide-sheaves.

Having thus described my invention, what I claim as new is—

The combination of the pivoted socket J with the reel-post and the boss L on the tubular drag-bar, for the purpose of forming a knuckle-joint for the foot of the reel-post and a shield to exclude the dirt from the pivot of the point, substantially as described.

WM. F. COCHRANE.

Witnesses:
E. A. ELLSWORTH,
N. K. ELLSWORTH.